(12) United States Patent
Pierce et al.

(10) Patent No.: US 12,730,689 B1
(45) Date of Patent: Sep. 8, 2026

(54) CONNECTOR PLATFORM

(71) Applicant: Adswerve, Inc., Denver, CO (US)

(72) Inventors: Jeff Pierce, Sandy Hook, CT (US); Brent Ramos, Denver, CO (US); Patrick Grady, Denver, CO (US); Jeffrey Stuart, Denver, CO (US); Petar Ivanov, Denver, CO (US)

(73) Assignee: Adswerve, Inc., Denver, CO (US)

( * ) Notice: Subject to any disclaimer, the term of this patent is extended or adjusted under 35 U.S.C. 154(b) by 827 days.

(21) Appl. No.: 18/114,153

(22) Filed: Feb. 24, 2023

Related U.S. Application Data

(60) Provisional application No. 63/313,704, filed on Feb. 24, 2022.

(51) Int. Cl.
*G06F 9/54* (2006.01)
*G06F 9/451* (2018.01)
*G06F 21/44* (2013.01)

(52) U.S. Cl.
CPC .............. *G06F 9/541* (2013.01); *G06F 9/451* (2018.02); *G06F 21/44* (2013.01)

(58) Field of Classification Search
None
See application file for complete search history.

(56) References Cited

U.S. PATENT DOCUMENTS 9,405,597 B1 * 8/2016 Luff ........................ G06F 9/546
11,032,160 B1 * 6/2021 Raheja ................ H04L 41/0843
2008/0209451 A1 * 8/2008 Michels .................. G06F 15/16 719/328
2012/0278284 A1 * 11/2012 Bayouth ............... G06F 16/313 707/E17.032
2016/0028737 A1 * 1/2016 Srinivasan .......... H04L 63/0807 726/4
2019/0129770 A1 * 5/2019 Krishnan ................ G06F 9/544
2022/0021677 A1 * 1/2022 Lee ....................... H04L 67/133
2022/0070055 A1 * 3/2022 Narasimhan .......... H04L 41/147

OTHER PUBLICATIONS

B. A. Sanchez, K. Barmpis, P. Neubauer, R. F. Paige and D. S. Kolovos, "RestMule: Enabling Resilient Clients for Remote APIs," 2018 IEEE/ACM 15th International Conference on Mining Software Repositories (MSR), Gothenburg, Sweden, 2018, pp. 537-541. (Year: 2018).*

* cited by examiner

*Primary Examiner* — Frank D Mills
(74) *Attorney, Agent, or Firm* — Lee & Hayes, P.C.

(57) ABSTRACT

A method, apparatus, and system for managing data in disparate platforms through an API are described. In response to receiving selection and activation of a connector platform, e.g., heterogenous connector platform, via a computer interface, the connector platform prompts for selection of at least first and second disparate platforms, with which the connector platform is to be authenticated. After authentication, the connector platform generates a unique gateway account key for the connector platform to access data associated with a first account on the first platform and a second account on the second platform, the first and second accounts being associated with the same user, and the connector platform creates a persistent connection between the first and second platforms employing a proactive monitoring process enabling fast, consistent, and reliable access to data associated with the first account on the first platform from the second platform via the connector platform.

20 Claims, 8 Drawing Sheets

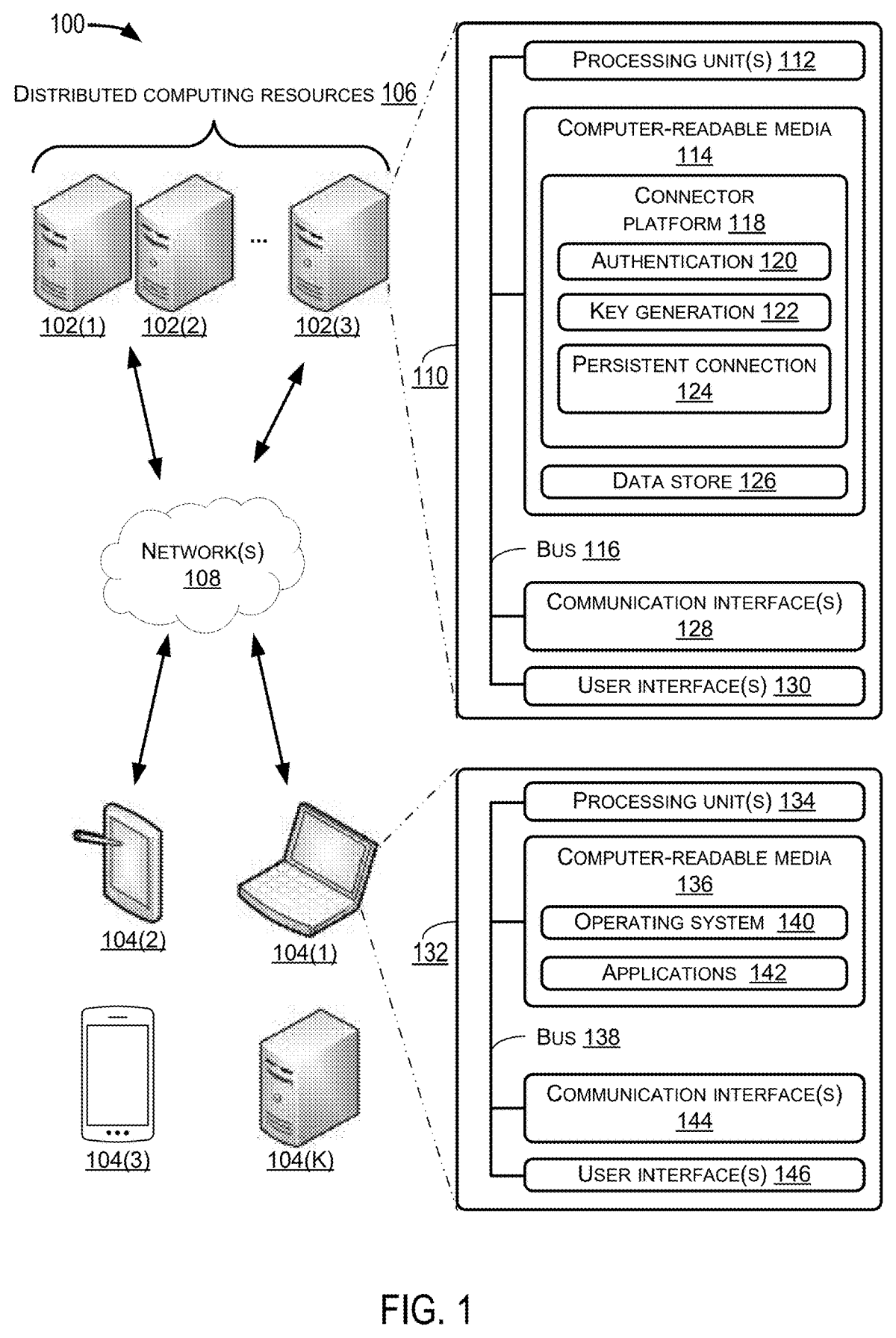

100

DISTRIBUTED COMPUTING RESOURCES 106

102(1) 102(2) ... 102(3)

NETWORK(S) 108

104(2) 104(1)

104(3) 104(K)

110

PROCESSING UNIT(S) 112

COMPUTER-READABLE MEDIA 114

CONNECTOR PLATFORM 118

AUTHENTICATION 120

KEY GENERATION 122

PERSISTENT CONNECTION 124

DATA STORE 126

BUS 116

COMMUNICATION INTERFACE(S) 128

USER INTERFACE(S) 130

132

PROCESSING UNIT(S) 134

COMPUTER-READABLE MEDIA 136

OPERATING SYSTEM 140

APPLICATIONS 142

BUS 138

COMMUNICATION INTERFACE(S) 144

USER INTERFACE(S) 146

FIG. 1

UNIFIRE

The UNIFIRE app allows digital media content to fully sync into a marketing platform for management and attribution with the click of a button.

APPLICATION OVERVIEW & KEY FEATURES

What you can expect from this app:

UNIFIRE allows you to fully sync social and other digital media platforms in marketing platforms like Search Ads 360 for management and attribution. The app acts as a conduit between digital media platforms like Facebook, Instagram, etc. and marketing ecosystems like Google to allow campaign management and attribution, e.g., via Floodlight tags to be extended to the digital media platforms.

For example, Facebook Ad Accounts that are synced into SA360 enjoy many of the hallmark features of the Search Ads 360 platform, including:

- Reporting on Floodlight-attributed conversations using new or existing custom columns against your Facebook campaign data
- Using non-last click attribution modeling for Floodlight conversions attributed to Facebook – including Data-Driven Attribution
- Simplifying management by applying rules or labels to Facebook content
- Utilizing bulks sheets or scheduled edits to make content changes at scale Once the UNIFIRE app is installed within Adswerve Connect, clients can create configurations which allow their Facebook Ad accounts to sync into their SA360 advertiser. When creating a configuration, clients will need to grant authorization to Facebook as well as Google in order for the app to work as intended.

When a configuration is set up within the UNIFIRE app, it can take up to 24 hours for your SA360 advertiser to gain the ability to sync a Facebook Ad account into it. After 24 hours, you will be able to add a Facebook engine just as you are used to when adding Google or Microsoft Ads accounts. The one small difference is that when you are beginning the engine setup in SA360, you will want to select the "Using a Gateway" radio button which lets SA360 know that this is a syncable engine and not a standard click tracking engine.

You will proceed through the remaining engine setup steps as normal, and once saved you're free to sync. After the sync completes, it can take upwards of 24-48 hours for historical content performance data to pass into SA360 from Facebook, however the content itself (campaigns, ad sets, etc.) will populate immediately upon sync completion.

FIG. 2B

UNIFIRE

Find connector by Advertiser, Connector Name, or Email

Granted by A. Engineer
(a.n.engineer@placeholder.com)

REMOVE APP

+ ADD CONNECTOR

| ENABLED | TYPE | MARKETING PLATFORM ADVERTISER | CONNECTOR NAME | CONNECTOR GRANTED BY | STATUS | ACTION |
| --- | --- | --- | --- | --- | --- | --- |
| | f | Advertiser Example 1 | Connector Name 1 | a.engineer@placeholder.com | CONFIGURED | ⋮ |
| | f | Advertiser Example 3 | My Connector | a.n.engineer@placeholder.com | CONFIGURED | ⋮ |
| | f | Advertiser Example 2 | Connector 2 | J.director@placeholder.com | PENDING | ⋮ |
| | f | Advertiser Example n | A's Connector | a.engineer@placeholder.com | CONFIGURED | ⋮ |
| | f | Loading Advertisers... | Funky Connector | a.n.engineer@placeholder.com | DISABLED | ⋮ |
| | f | Loading Advertisers... | My 2nd Connector | a.n.engineer@placeholder.com | PENDING | ⋮ |
| | f | Loading Advertisers... | Test Connector | w.developer@placeholder.com | PENDING | ⋮ |
| | f | Loading Advertisers... | New Connector | a.engineer@placeholder.com | PENDING | ⋮ |
| | f | Loading Advertisers... | Let's Connect Stuff | a.engineer@placeholder.com | PENDING | ⋮ |

FIG. 2C

CONNECTOR PLATFORM

PRIORITY CLAIM

This application claims the priority of U.S. Provisional application Ser. No. 63/313,704, which was filed Feb. 24, 2022, and is incorporated herein by reference for all purposes.

TECHNICAL FIELD

The present disclosure generally relates to the field of content management, and more specifically to methods, apparatus, and system for managing data and information on disparate platforms through an application programming interface (API).

BACKGROUND

It is often difficult to import data from one platform into a different platform, e.g., social media platforms, marketing platforms, etc. and/or to manage the data from the different platforms. Currently, an entity using a platform that is different from the one used by the social media is likely required to work with the provider, or the owner, of the social media to gain understanding of the specifics of the application programming interface (API) of the social media to be able to import and/or manage data from the social media platform. Because different social media platforms may utilize different APIs, difficulty increases as the number of platforms for the entity to access increases.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

FIG. 1 illustrates an example environment in which a connector platform, e.g., a heterogenous connector platform or universal connector platform, system may be utilized.

FIGS. 2A-2E illustrate a series of example user interfaces of a connector platform system to manage data in disparate platforms.

FIG. 2A illustrates a representation of an example part of an application (app) store user interface (UI) pertaining to a connector platform.

FIG. 2B illustrates a representation of a more detailed description of capabilities of an example connector platform related to the disparate platforms for which the example connector platform from FIG. 2A is active.

FIG. 2C illustrates a representation of an example interface produced after launching a connector platform app based on selection of the UI button from FIG. 2A to go to the app.

FIG. 2D illustrates a representation of a UI presented after receiving a selection of the UI button to add a connector from FIG. 2C.

FIG. 2E illustrates a representation of a UI presented after receiving a selection of the UI authorization button from FIG. 2D.

DETAILED DESCRIPTION

Figure 2A:
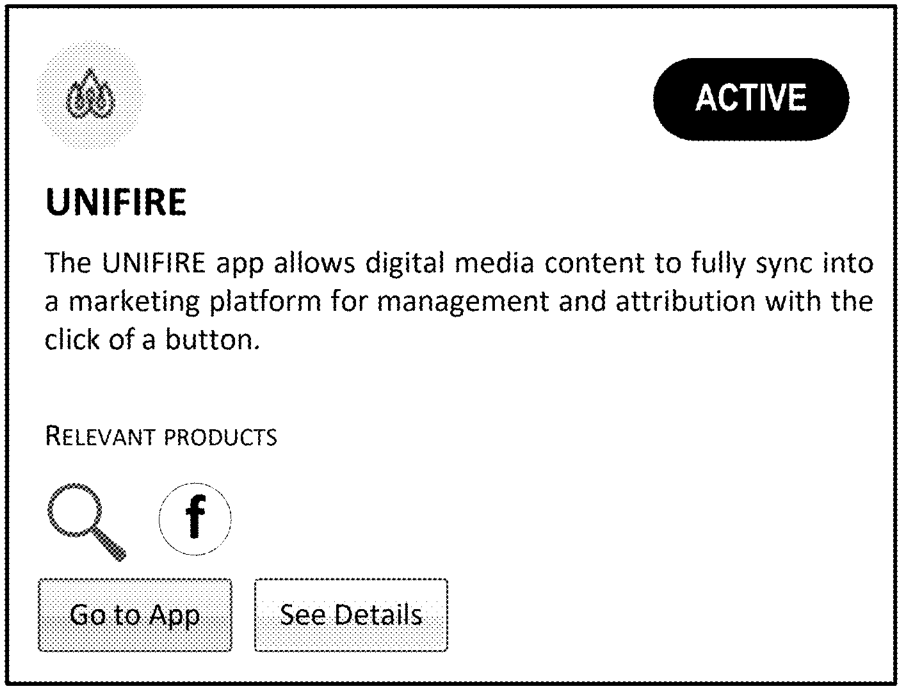

A method, apparatus, and system for managing data and information in disparate platforms through an API are described herein.

Various business users, e.g., marketers, purchasers, etc. often desire, or need, to access data on a first platform from a second platform that is not directly compatible with, and/or disparate from, the first platform. For example, the first platform may include a digital media platform, e.g., a social media platform, such as FACEBOOK, INSTAGRAM, TIK TOK, etc., and the second platform may include a marketing platform, e.g., GOOGLE MARKETING PLATFORM (GMP), MICROSOFT ADS, THE TRADE DESK, AMAZON ADS, and/or similar marketing ecosystems for search, presentation, and/or ecommerce ad content management. In various examples, the data may include click, cost, content, and impression level data available from the first platform. The business users may also desire, or need, to be able to manage or write content for presentation on and/or edit content for the first platform from the second platform. Moreover, business users want a simple connect/disconnect process that can be utilized and scaled for multiple entities, e.g., advertisers, vendors, etc., while being secure and compliant with the terms of use of both the first platform and the second platform.

In some examples, a business user may first be directed to a website and be presented with a user interface (UI), which may include an app store showing a plurality of applications including a connector platform, e.g., a heterogenous connector platform or universal connector platform such as UNIFIRE from ADSWERVE. In response to receiving a selection of the connector platform, the UI can present a prompt to authenticate the connector platform with a desired first platform, such as FACEBOOK, INSTAGRAM, TIK TOK, etc., and a second platform, such as the GMP, MICROSOFT ADS, THE TRADE DESK, AMAZON ADS, and/or similar ecosystems for search, presentation, and/or ecommerce ad content management. After authentication, the connector platform generates a unique gateway account key that enables the connector platform to access data associated with a first user account on the first platform and a second user account on the second platform, the first user account and the second user account being associated with the same user. The connector platform provides the unique gateway account key to the second platform. The connector platform creates a persistent connection between the first platform and the second platform, and enables the business user to access the data associated with the first user account on the first platform from the second platform via the heterogenous connector platform or universal connector platform.

FIG. 1 shows an example environment 100 in which examples of a connector platform, e.g., a heterogenous connector platform or universal connector platform such as UNIFIRE from ADSWERVE, system can operate and/or in which a process associated with a connector platform, e.g., a heterogenous connector platform or universal connector platform system as described herein can be performed. The illustrated environment includes computing device(s) 102(1)-102(N) (individually and/or collectively referred to herein with reference number 102), where N is any integer greater than and/or equal to 1. The computing device(s) 102 can include server(s) and/or desktop computer(s), for example. The illustrated environment also includes computing devices 104(1)-104(K) (individually and/or collectively referred to herein with reference number 104), where K is any integer greater than and/or equal to 1. In some examples, N=K; in other examples, N>K or N<K. The computing devices 104 can include, for example, desktop computer(s), laptop computer(s), tablet computer(s), hybrid computing device(s), and/or smart phone(s). The computing device(s) 102 and/or 104 can include a diverse variety of device categories, classes, and/or types and are not limited to any of the particular types of devices illustrated.

In the illustrated example, the computing device(s) 102(1)-102(N) can be computing nodes of distributed computing resources 106, e.g., in a computing cluster, such as a cloud service such as MICROSOFT AZURE, VMWARE VCLOUD, RACKSPACE, Inc.'s OPENSTACK, AMAZON WEB SERVICES (AWS), IBM SMARTCLOUD, ORACLE CLOUD, etc. In the illustrated example, the computing device(s) 104 can include consumer devices and in some instances can operate as clients of the distributed computing resources 106 that can submit jobs to the distributed computing resources 106 and/or receive job results from the distributed computing resources 106. The computing devices 102(1)-102(N) in the distributed computing resources 106 can, share resources, balance load, increase performance, and/or provide fail-over support and/or redundancy, etc. The computing devices 104 can additionally or alternatively operate in a cluster and/or grouped configuration via association with one or more user(s).

By way of example and not limitation, the computing device(s) 102 can include, but are not limited to, server computers and/or blade servers such as Web servers, connector platform map/reduce servers and/or other computation engines, and/or network-attached-storage units (e.g., 102(1)). By way of example and not limitation, the computing device(s) 104 can include, but are not limited to, laptop computers (e.g., 104(1)), tablet computers (e.g., 104(2)), tablet hybrid computers 104(3), desktop computers (e.g., 104(K)), and/or other telecommunication devices, desktop computers, and/or integrated components for inclusion in computing devices, appliances, and/or other computing device(s) configured to participate in and/or carry out a workflow method associated with a heterogenous connector platform or universal connector system as described herein.

In some examples, as indicated, computing device(s), e.g., the computing devices 102 and 104, can intercommunicate to participate in and/or carry out a process associated with a connector platform, e.g., a heterogenous connector platform or universal connector system as described herein. For example, the computing device 104 can be a query source and/or data source and computing device 102 can host modules and/or components of a connector platform, e.g., a heterogenous connector platform or universal connector system such as UNIFIRE from ADSWERVE, to store data, to be queried, and/or to provide processing resources to manage data as described below with reference to the accompanying figures.

Different devices and/or types of the computing devices 102 and 104 can have different needs and/or ways of interacting with the distributed computing resources 106. For example, the computing devices 104 can interact with the distributed computing resources 106 with discrete request/response communications, e.g., for responses and/or updates to manage data of a user in the first platform such as digital media, e.g., social media. Additionally, and/or alternatively, the computing devices 104 can be query sources and/or data sources and can interact with the distributed computing resources 106 with discrete and/or ongoing transmissions of data to be used as input to the connector platform.

In some examples, the computing devices 102 and/or 104 can communicate with each other and/or with other computing devices via one or more network(s) 108. In some examples, the computing devices 102 and 104 can communicate with external devices via the network(s) 108. For example, the network(s) 108 can include public networks such as the Internet, private networks such as an institutional and/or personal intranet, and/or combination(s) of private and public networks. Private networks can include networks connected to the Internet and/or other public network(s) via network address translation (NAT) devices, firewalls, network intrusion detection systems, and/or other devices that restrict and/or control the types of network packets permitted to flow between the private network and the public network(s).

The network(s) 108 can include any type of wired and/or wireless network, including but not limited to local area networks (LANs), wide area networks (WANs), satellite networks, cable networks, Wi-Fi networks, WiMAX networks, mobile communications networks (e.g., 3G, 4G, 5G, and so forth), any combination thereof, etc. Network(s) 108 can utilize communications protocols, such as, for example, packet-based and/or datagram-based protocols such as Internet Protocol (IP), Transmission Control Protocol (TCP), User Datagram Protocol (UDP), other types of protocols, and/or combinations thereof. Moreover, the network(s) 108 can also include a number of devices that facilitate network communications and/or from a hardware infrastructure for the networks, such as switches, routers, gateways, access points, firewalls, base stations, repeaters, backbone devices, and the like. The network(s) 108 can also include devices that facilitate communications between the computing devices 102 and/or 104 using bus protocols of various topologies, e.g., crossbar switches, INFINIBAND switches, FIBRE CHANNEL switches and/or hubs, etc.

In some examples, the network(s) 108 can further include devices that enable connection to a wireless network, such as a wireless access point (WAP). Examples support connectivity through WAPs that send and receive data over various electromagnetic frequencies (e.g., radio frequencies), including WAPs that support Institute of Electrical and Electronics Engineers (IEEE) 802.11 standards (e.g., 802.11g, 802.11n, and so forth), and/or one or more other standards, e.g., BLUETOOTH, cellular-telephony standards such as code division multiple access (CDMA), global system for mobile communication (GSM), 3rd Generation Partnership Project (3GPP) standards, such as long-term evolution (LTE) and/or new radio (NR), voice over internet protocols (VOIP), worldwide interoperability for microwave access (WiMAX), etc.

Different networks have different characteristics, e.g., bandwidth, latency, accessibility (open, announced but secured, and/or not announced), and/or coverage area. The type of the network 108 used for any given connection between, e.g., the computing device 104 and distributed computing resources 106 can be selected based on these characteristics and on the type of interaction.

Still referring to the example of FIG. 1, details of an example computing device 102(3) are illustrated at inset 110. The details of the example computing device 102(3) can be representative of others of computing device(s) 102.

However, each of the computing device(s) 102 can include additional or alternative hardware components and/or software modules.

The illustrated computing device 102 can include one or more processing unit(s) 112, e.g., integrated electronic circuit(s) operably connected to one or more computer-readable media 114, e.g., memories, such as via a bus 116. In some examples, a plurality of processing unit(s) 112 can exchange data through an internal interface bus (e.g., PCIe), rather than and/or in addition to the network 108. While the processing unit(s) 112 are described as residing on the computing device 102(3), in this example, the processing unit(s) 112 can also reside on different computing device(s) 102 and/or 104 in some examples. In some examples, at least two of the processing unit(s) 112 can reside on different computing device(s) 102 and/or 104. In such examples, multiple processing unit(s) 112 on the same computing device 102 and/or 104 can use a bus 116 of the computing device 102 and/or 104 to exchange data, while processing unit(s) 112 on different computing device(s) 102 and/or 104 can exchange data via the network(s) 108.

The processing unit(s) 112 can include one or more microprocessors, single-core processors, multi-core processors, central processing units (CPUs), graphics processing units (GPUs), general-purpose graphics processing units (GPGPUs), and/or hardware logic components configured, e.g., via specialized programming from modules and/or APIs, to perform functions described herein. For example, and without limitation, illustrative types of hardware logic components that can be used in and/or as the processing unit(s) 112 include Field-Programmable Gate Arrays (FPGAs), Application-Specific Integrated Circuits (ASICs), Application-Specific Standard Products (ASSPs), System-on-a-Chip systems (SOCs), Complex Programmable Logic Devices (CPLDs), Digital Signal Processors (DSPs), quantum processors, and other types of customizable processors. For example, a processing unit 112 can represent a hybrid device, such as a device from ALTERA and/or XILINX that includes a CPU core embedded in an FPGA fabric. These and/or other hardware logic components can operate independently and/or, in some instances, can be driven by a CPU. In some examples, at least some of the computing device(s) 102 and/or 104 can include a plurality of processing unit(s) 112 of multiple types. For example, the processing unit(s) 112 shown in the computing device 102(3) can be a combination of one or more CPUs, GPUs, GPGPUs, FPGAs, etc. Different processing unit(s) 112 can have different execution models, e.g., as is the case for GPUs and CPUs.

Computer-readable media described herein, e.g., computer-readable media 114, includes digital storage media also termed non-transitory computer-readable media, and/or communication media. Digital storage media includes tangible storage units such as volatile memory, nonvolatile memory, and/or other persistent and/or auxiliary computer storage media, removable and non-removable digital storage media implemented in any method and/or technology for storage of information such as computer-readable instructions, data structures, program modules, and/or other data. Digital storage media includes tangible and/or physical forms of media included in a device and/or hardware component that is part of a device and/or external to a device, including but not limited to random access memory (RAM), static RAM (SRAM), dynamic RAM (DRAM), phase change memory (PRAM), read-only memory (ROM), erasable programmable read-only memory (EPROM), electrically erasable programmable read-only memory (EEPROM), flash memory, compact disc read-only memory (CD-ROM), digital versatile disks (DVDs), optical cards and/or other optical storage media, magnetic cassettes, magnetic tape, magnetic disk storage, magnetic cards and/or other magnetic storage devices and/or media, solid-state memory devices, storage arrays, network attached storage, storage area networks, hosted computer storage and/or memories, storage, devices, and/or storage media that can be used to store and maintain information for access by a computing device 102 and/or 104.

In contrast to digital storage media also termed non-transitory computer-readable media, communication media can embody computer-readable instructions, data structures, program modules, and/or other data in a modulated data signal, such as a carrier wave, and/or other transitory transmission mechanism. As defined herein, digital storage media does not include communication media.

In some examples, the computer-readable media 114 can store instructions executable by the processing unit(s) 112 that, as discussed above, can represent a processing unit incorporated in the computing device 102. The computer-readable media 114 can additionally and/or alternatively store instructions executable by external processing units such as by an external CPU and/or external processor of any type discussed herein. In some examples at least one processing unit 112, e.g., a CPU, GPU, and/or hardware logic device, can be incorporated in the computing device 102, while in some examples at least one processing unit 112, e.g., one or more of a CPU, GPU, and/or hardware logic device, can be external to the computing device 102.

The computer-readable media 114 can store, for example, computer-executable instructions of programs, and/or applications that are loadable and executable by the processing unit(s) 112 such as an operating system and/or programming to operate a connector platform 118, e.g., a heterogenous connector platform or universal connector platform such as UNIFIRE from ADSWERVE, and/or other modules. In various examples, the computer-readable media 114 can store, computer-executable instructions of an authentication module or component 120, which can configure the processing unit(s) 112 to perform authentication of the connector platform 118 with a first platform and a second platform that are based on disparate platforms, a key generation module or component 122, which can configure the processing unit(s) 112 to generate a unique gateway account key for enabling the connector platform 118 to access data associated with a first user account on the first platform and a second user account on the second platform, (the first user account and the second user account being associated with a same user), and/or a persistent connection module or component 124, which can configure the processing unit(s) 112 to create a persistent connection between the first platform and the second platform for the connector platform 118 to access data associated with the first user account on the first platform and the second user account on the second platform, each of which can be associated with the connector platform 118. In some examples not shown, one or more of the processing unit(s) 112 in one of the computing device(s) 102 and/or 104 can be operably connected to the computer-readable media 114 in a different one of the computing device(s) 102 and/or 104, e.g., via communications interface and the network 108. For example, a program code to perform operations herein, e.g., as described herein with reference to the process associated with the connector platform 118, can be downloaded from a computing device 102 operating as a server to a computing device 104 operating as a client, e.g., via the network 108, and executed by one or more processing unit(s) in the computing device 104. For example, the computer-executable instructions stored on the computer-readable media 114 can upon execution configure a computer such as a computing device 102 and/or 104 to perform operations described herein with reference to the operating system and/or connector platform 118, and one or more of the authentication module or component 120, the key generation module or component 122, and/or the persistent connection module or component 124.

Computer-readable media 114 can store, for example, one or more datastore(s) 126. Datastore(s) 126 can include multiple disparate databases or data sources such as data associated with the first platform and/or data associated with the second platform. For example, the connector platform 118 can store and/or access click, cost, content, spend, cost per action, action type, impressions, and/or other impression level data associated with a first user account associated with the first platform and/or a second user account associated with the second platform (the first user account and the second user account being associated with the same person) in one or more datastore(s) 126. In at least one example, the authentication module or component 120, the key generation module or component 122, and/or the persistent connection module or component 124 associated with connector platform 118 can perform data analysis and/or processing on input from the multiple disparate data sources to generate an integrated workflow of activities that are appropriate for authenticating the connector platform 118 with the first platform and/or the second platform.

The bus 116, which in some instances can include one or more of a system bus, a data bus, an address bus, a Peripheral Component Interconnect (PCI) Express (PCIe) bus, a PCI bus, a Mini-PCI bus, and any variety of local, peripheral, and/or independent buses, and/or any combination thereof can operably connect one or more processing unit(s) 112 to one or more computer-readable media 114.

The computing device 102 can also include one or more communications interfaces 128 connected via the bus 116 to the processing unit(s) 112 to enable wired and/or wireless communications between the computing device(s) 102 and other networked computing devices 102 and/or 104 involved in the process associated with the connector platform 118, and/or other computing device(s), e.g., over the network(s) 108. Such communications interface(s) 128 can include one or more transceiver devices, e.g., network interface controllers (NICs) such as Ethernet NICs and/or other types of transceiver devices, to send and receive communications over a network. The processing unit(s) 112 can exchange data through respective communications interface(s) 128. In some examples, the communications interface 128 can include a PCI Express (PCIe) transceiver, and the network 108 can include a PCIe bus. In some examples, the communications interface 128 can include, but is not limited to, a transceiver for cellular (3G, 4G, 5G, and/or other), Wi-Fi, Ultra-wideband (UWB), BLUETOOTH, and/or satellite transmissions. The communications interface 128 can include a wired I/O interface, such as an Ethernet interface, a serial interface, a Universal Serial Bus (USB) interface, an INFINIBAND interface, and/or other wired interfaces. The communications interface 128 can additionally and/or alternatively include one or more user-interface devices, buses such as memory buses and/or local buses, memory interfaces, and/or hardwired interfaces such as 0-20 mA control lines. For simplicity, these and other modules or components are omitted from the illustrated computing device 102(3).

As noted above, computer-readable media 114 of the computing device 102 can store an operating system and/or the connector platform 118. In some examples, an operating system is not used (commonly referred to as a "bare metal" configuration). In some examples, the operating system and/or the connector platform 118 can include modules or components that enable and/or direct the computing device 102 to receive data via various input interfaces (e.g., user controls, network and/or communications interfaces, memory devices, and/or sensors), and process the data using the processing unit(s) 112 to generate output. The operating system and/or the connector platform 118 can further include one or more modules or components that provide output (e.g., present an image on an electronic screen, store data in memory, and/or transmit data to another computing device). User interface(s) (UI)s 130 described herein can include one or more of a graphical user interface (GUI), and audio user interface (AUI), and/or various other input/output interfaces generally referenced as UI including touch-input interfaces and the like. Additionally, the operating system and/or the connector platform 118 can include modules or components that perform various functions generally associated with an operating system, e.g., storage management and internal-device management.

Details of an example computing device 104(1) are illustrated at inset 132. The details of example computing device 104(1) can be representative of others of computing device(s) 104. However, each of the computing device(s) 104 can include additional and/or alternative hardware and/or software components. Computing device 104(1) can include one or more processing unit(s) 134 operably connected to one or more computer-readable media 136, e.g., via a bus 138. Some examples of the processing unit(s) 134 are discussed above with reference to the processing unit(s) 112. Some examples of the computer-readable media 136 are discussed above with reference to the computer-readable media 114. For example, the computer-readable media 136 can include one or more digital storage media and/or communications media. Some examples of the bus 138 are discussed above with reference to the bus 116.

The computer-readable media 136 can store, for example, computer-executable instructions of an operating system 140, and/or other modules, programs, and/or applications 142 that are loadable and executable by the processing unit(s) 134. In various examples, some applications represented by applications 142 can be compatible and operable with the connector platform 118; meanwhile, in some examples applications 142 can include a connector platform application configured to operate with connector platform 118. Some examples of the operating system 140 are discussed above with reference to the inset 110.

In some examples, the computing device 104 can be configured to communicate with the distributed computing resources 106 and/or the computing device(s) 102 via a communications interface 144. Connector platform compatible application(s) in the applications 142 on the computing device 104 can enable management of one or more types of data from the first platform and/or the second platform through the distributed computing resources 106 and/or the computing device(s) 102. A connector platform compatible application can send a query and/or send information to datastore 126 and can manage the data associated with the first user account associated with the first platform and the second user account associated with the second platform. For example, the computing device 104 can transmit a request to the distributed computing resources 106 and/or the computing device(s) 102 for an integrated output of activities associated with click, cost, content, and impression level data associated with the first user account associated with the first platform and/or the second user account associated with the second platform.

Computing device 104 can also include one or more communications interfaces 144 connected via the bus 138 to the processing unit(s) 134 to enable wired and/or wireless communications between computing device(s) 104, distributed computing resources 106, and/or other networked computing devices over network(s) 108. Some examples are discussed above with reference to communications interface(s) 128.

Computing device 104 can include a user interface 146. For example, computing device 104(4) can provide the user interface 146 to control and/or otherwise interact with the connector platform 118, distributed computing resources 106, and/or computing devices 102. For example, the processing unit(s) 134 can receive inputs e.g., typed and/or spoken queries, selections, and/or other input actions associated with managing the data of the user in the first platform and/or the second platform via the user interface 146 and transmit corresponding data via the communications interface(s) 144 to computing device(s) 102.

User interfaces 130 and/or 146 can include one or more input devices, integral and/or peripheral to computing device 102 and/or 104. The input devices can be user-operable, and/or can be configured for input from other computing device 102 and/or 104. Examples of input devices can include, e.g., a keyboard, keypad, a mouse, a trackball, a pen sensor and/or smart pen, a light pen and/or light gun, a joystick controller, a voice input device such as a microphone, voice-recognition device, and/or speech-recognition device, a touch input device such as a touchscreen and/or a touch pad, a gestural and/or motion input device such as a depth camera, a grip sensor, an accelerometer, another haptic input, a visual input device such as one or more cameras and/or image sensors, a QR code or bar code scanner, and the like. User interfaces 130 and/or 146 can include one or more output devices configured for communication to a user and/or to another computing device 102 and/or 104. Output devices can be integral and/or peripheral to computing device 102 and/or 104. Examples of output devices can include a display screen or monitor, a printer, audio speakers, beepers, and/or other audio output devices, a vibration motor, linear vibrator, and/or other haptic output devices, or the like.

FIGS. 2A-2E illustrate a series of example user interfaces of a connector platform system to manage data in disparate platforms. In various examples, a connector platform 118 as referenced in the discussion of FIG. 1 can cause UI 130 or 146 as described above with reference to FIG. 1 to present user interfaces as illustrated in FIGS. 2A-2E among others.

FIG. 2A, for example, represents a part of an application (app) store user interface (UI) pertaining to a connector platform, e.g., UNIFIRE from ADSWERVE in the illustrated example, though the techniques and interfaces described can be implemented in other connector platforms. Within the app store an end user can select the connector platform as an app to install for use to connect disparate platforms. In some examples, there may be an option to access a website version of the app. In various examples, the app store UI can include a brief summary of the app's capabilities as well as an indication of whether the app is already installed, or active for the particular user, and if so for which disparate platforms. In the illustration, the disparate platforms for which the app is active are illustrated via icons, though text, sounds, etc. may be employed in some examples. The illustrated example includes selectable UI buttons to launch or go to the app or to see details about the app without launching it, which can be helpful for new users, e.g., end users that are new to an existing account.

FIG. 2B, for example, represents a more detailed description of the connector platform's capabilities related to the disparate platforms for which it is active, which in the illustrated example of FIG. 2A are SA360 and FACEBOOK. A more detailed description of the connector platform's capabilities as shown in FIG. 2B may be produced based on selection of the UI button for details from FIG. 2A. FIG. 2B illustrates an example related to UNIFIRE from ADSWERVE and notes that the UNIFIRE app allows FACEBOOK content to fully sync into GOOGLE's SEARCH ADS 360 for management and attribution via a FLOODLIGHT tag with the click of a button. A UI such as that shown in FIG. 2B can provide an overview of the connector platform application and present key features, for example:

- UNIFIRE allows you to fully sync social and other digital media platforms in marketing platforms like Search Ads 360 (SA360) for management and attribution. The app acts as a conduit between digital media platforms like FACEBOOK, INSTAGRAM, etc. and marketing ecosystems like GOOGLE to allow campaign management and attribution, e.g., via FLOODLIGHT tags to be extended to the digital media platforms. For example, FACEBOOK Ad Accounts that are synced into SA360 enjoy many of the hallmark features of the Search Ads 360 platform, including:
  - Reporting on FLOODLIGHT—attributed conversations using new or existing custom columns against your FACEBOOK campaign data
  - Using non-last click attribution modeling for FLOODLIGHT conversions attributed to FACEBOOK—including Data-Driven Attribution
  - Simplifying management by applying rules or labels to FACEBOOK content
  - Utilizing bulks sheets or scheduled edits to make content changes at scale.
- Once the UNIFIRE app is installed within ADSWERVE CONNECT, clients can create configurations which allow their FACEBOOK Ad accounts to sync into their SA360 advertiser. When creating a configuration, clients will need to grant authorization to FACEBOOK as well as GOOGLE in order for the app to work as intended.
- When a configuration is set up within the UNIFIRE app, it can take up to 24 hours for your SA360 advertiser to gain the ability to sync a FACEBOOK Ad account into it. After 24 hours, you will be able to add a FACEBOOK engine just as you are used to when adding GOOGLE or MICROSOFT Ads accounts. The one small difference is that when you are beginning the engine setup in SA360, you will want to select the "Using a Gateway" radio button which lets SA360 know that this is a syncable engine and not a standard click tracking engine.
- You will proceed through the remaining engine setup steps as normal, and once saved you're free to sync. After the sync completes, it can take upwards of 24-48 hours for historical content performance data to pass into SA360 from FACEBOOK, however the content itself (campaigns, ad sets, etc.) will populate immediately upon sync completion.

FIG. 2C, for example, represents an interface presented after launching or going to the app produced based on selection of the UI button to go to the app from FIG. 2A. The UI shown in FIG. 2C illustrates a field for the end user to search for a connector based on an advertiser, a connector name, or an email, though fewer or more search options may be included in some examples. In the example UI shown in FIG. 2C presents the name and contact information for a representative of the connector platform who has activated the account the end user is accessing via the app. The UI shown in FIG. 2C also provides options for removal of the app and/or addition of a new connector via buttons in the UI. FIG. 2C illustrates nine connections for various GOOGLE SA360 advertisers to FACEBOOK of which eight are enabled. Of the eight that are enabled in the illustration, the status of three is configured and the status of five is pending. Meanwhile, the status of one is disabled. The connector platform user interface presents an option for end users to provide a connector name associated with the particular SA360 Advertiser as well as designating who has granted the connector, though fewer or more details may be provided in some examples.

Figure 2E:
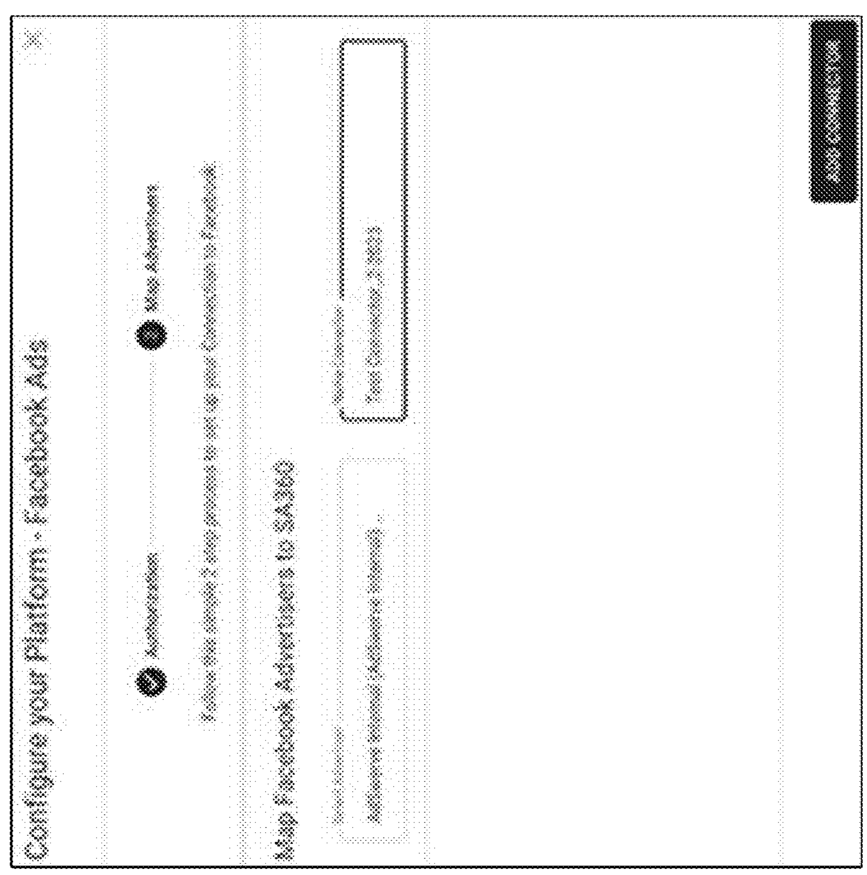
Figure 2D:
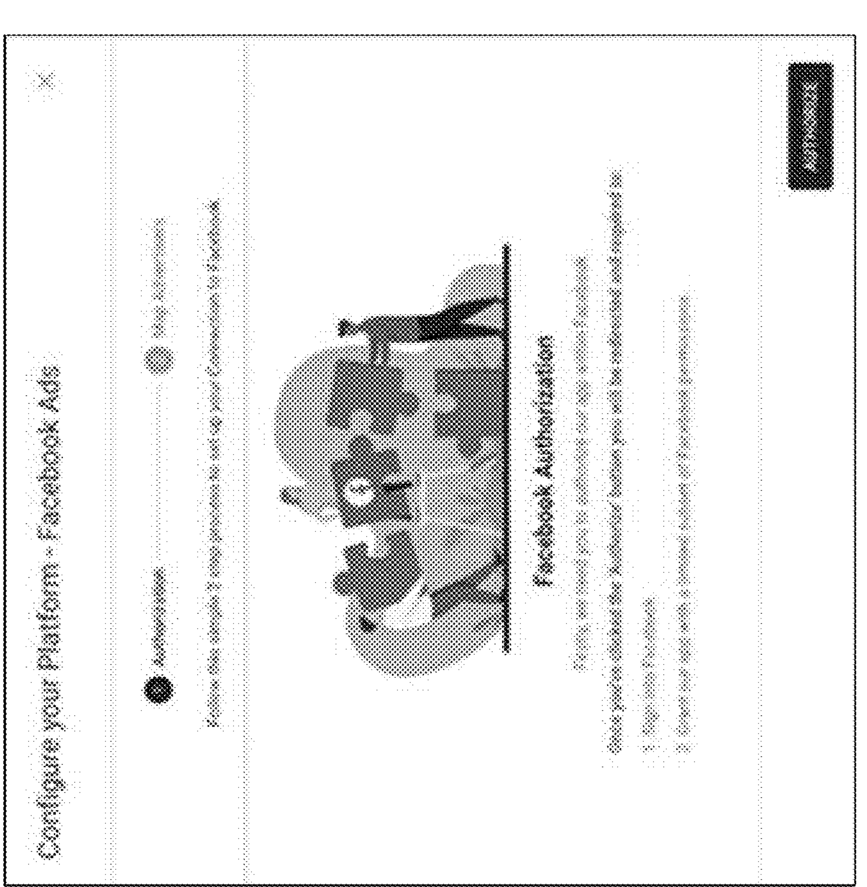

FIG. 2D, for example, represents a UI presented after receiving a selection of the UI button to add a connector from FIG. 2C. In at least one example, the UI of FIG. 2D can be presented as a popup display. In some examples, the UI of FIG. 2D can be presented as a separate screen or webpage. As shown in FIG. 2D, the connector platform alerts the end user that they are about to request authorization for the connector platform to access a subset of permissions for a digital media platform, e.g., a social media platform, which in the illustrated example is FACEBOOK. The UI shown in FIG. 2D provides a button to receive an indication of authorization to proceed.

FIG. 2E, for example, represents a UI presented after receiving a selection of the UI authorization button from FIG. 2D. Similar to the UI of FIG. 2D, the UI of FIG. 2E can be presented as a popup display. In some examples, the UI of FIG. 2E can be presented as a separate screen or webpage. As shown in the example of FIG. 2E, the connector platform illustrates that the account is being configured for FACEBOOK ADS and prompts for selection or entry of the advertiser to be mapped to SA360. The example UI also provides a field to receive a name for the new connector. The example UI also provides a button for selection when those two fields have entries completed. After the button has been selected to add the connector from FIG. 2E, the connector platform can present the UI of FIG. 2C, including the newly added connector with a pending status.

Figure 3:
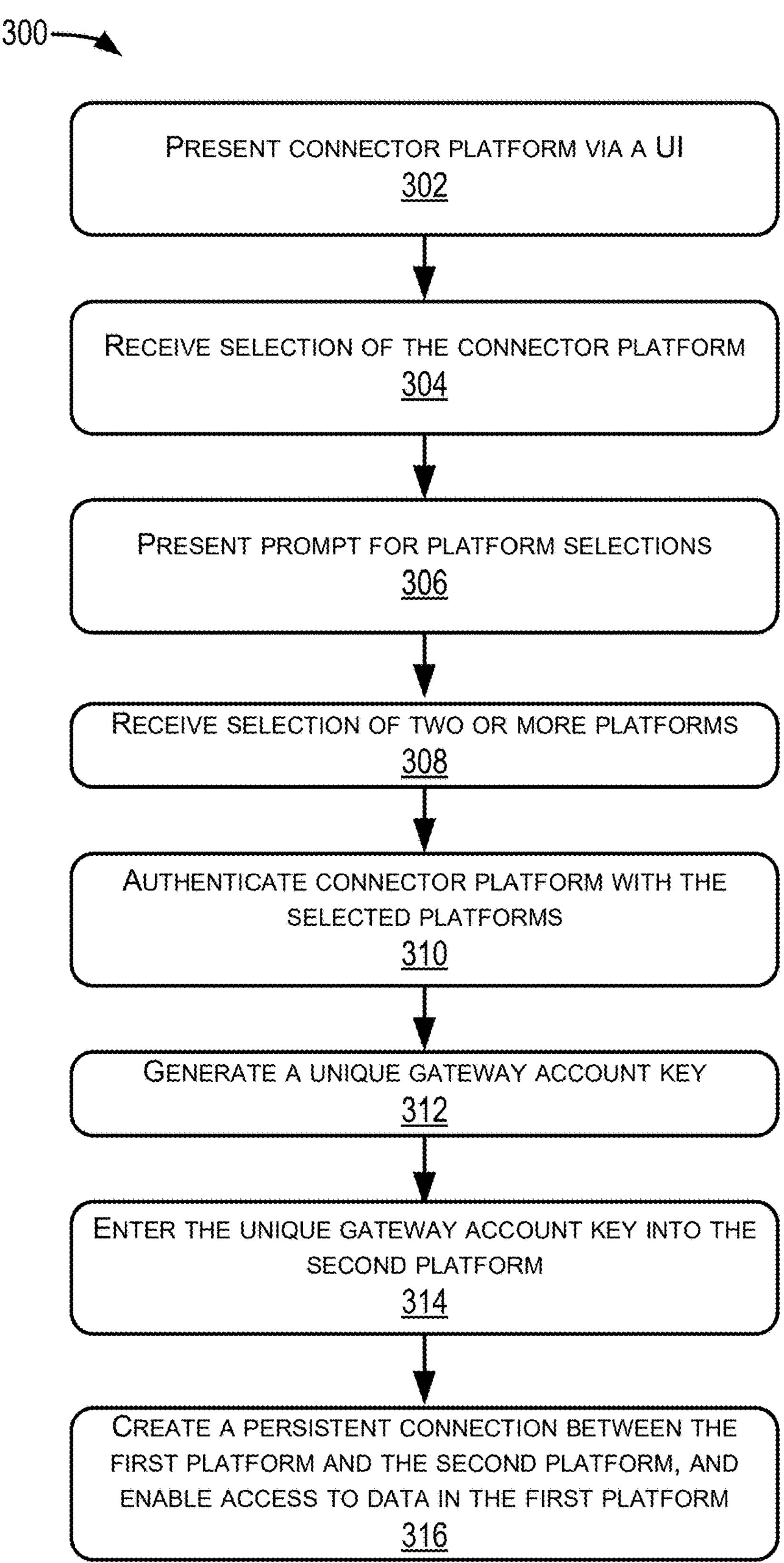
FIG. 3 illustrates an example process of the connector platform system managing data in disparate platforms.

FIG. 3 illustrates an example process 300 for a connector platform as described herein, e.g., a heterogenous connector platform or universal connector platform such as UNIFIRE from ADSWERVE, to manage data, including data in two or more disparate platforms. End users can benefit from consolidated data tracking and attribution provided by a connector platform, e.g., a connector platform as illustrated in FIGS. 2A through 2E and also described herein. The visibility to consolidated data tracking and attribution via the user interface provided by the connector platform enables presentation of data from the multiple platforms within a single UI, which can save time and reduce network traffic since less calls are required to successfully and reliably obtain data in a shorter amount of time compared to users attempting to manually obtain data individually from each platform. The connector platform can optimize management of the data from multiple platforms that were not designed to work together and indeed may be incompatible.

A connector platform as described herein can provide a secure communication channel to multiple disparate platforms. For example, the connector platform can facilitate secure communication on behalf of an end user to multiple platforms and can consolidate data from the multiple platforms in one or more data stores. A connector platform as described herein allows end users to configure the connector platform securely, and to securely decouple the grant process from the proxy process. A connector platform as described herein can separate generating account security and multi-tenancy so that one user, having multiple accounts, which can be on multiple platforms, can securely access data from these accounts via a single interface. A connector platform as described herein is scalable to serve the needs of commercial enterprises of all sizes. A connector platform as described herein can operate at the center of a Many-to-Many relationship between platforms. A connector platform as described herein can provide ease of governance via a UI that enables end-user review of which platforms have and have not yet been connected via the connector platform. A connector platform as described herein can mediate transactions between any two or more platforms using a generated key. A connector platform as described herein can offer a security layer to the platforms regardless of their respective APIs.

In this example, a first platform of the two disparate platforms may include a digital media platform, e.g., a social media platform, such as FACEBOOK, INSTAGRAM, TIKTOK, etc., and a second platform of the two disparate platforms may include a marketing platform, e.g., GOOGLE MARKETING PLATFORM (GMP), MICROSOFT ADS, THE TRADE DESK, AMAZON ADS, and/or similar ecosystems for search, presentation, and/or ecommerce ad content management. Because the first platform and the second platform are disparate platforms, they are not directly compatible with each other, and data in one platform is not accessible or directly manageable from the other platform.

At block 302, a plurality of applications including the connector platform 118, e.g., a heterogenous connector platform or universal connector platform, such as UNIFIRE from ADSWERVE, may be presented, e.g., in a form of an app store via a UI, such as a UI 130 or 146 as described above with reference to FIG. 1. As described above with reference to FIG. 1, the connector platform may be hosted by a single computing device/server or be distributedly hosted by a plurality of computing devices/servers. At block 304, a selection of the connector platform may be received via the UI. The connector platform may be uniquely associated with a plurality of disparate platforms. At block 306, in response to receiving the selection of the connector platform, the UI may present a prompt, for selection of desired platforms. At block 308, the connector platform receives an indication of two or more platforms having been selected, for example, FACEBOOK being selected as the first platform and the GMP being selected as the second platform via the UI.

At block 310, the connector platform may be authenticated with the selected first and second platforms, for example, by utilizing one or more protocols such as OAuth 1.0 protocol, OAuth 2.0 protocol, No Auth protocol, API Keys, Bearer Tokens, Basic Auth protocol, JWT Bearer protocol, Digest Auth protocol, AWS signature protocol, a hash-based message authentication code (HMAC) protocol, etc. At block 312, the connector platform may generate a unique gateway account key which enables the connector platform to access data associated with a first user account on the first platform and a second user account on the second platform—the first user account and the second user account being associated with the same user. The unique gateway account key may then be stored in a secure storage such as GOOGLE SECRET MANAGER, AWS SECRETS MANAGER, AZURE KEY VAULT, etc. represented by element 126, for example. At block 314, the connector platform can provide a unique gateway account key to the second platform. At block 316, connector platform may create a persistent connection between the first platform and the second platform, and enable access to the data associated with the first user account on the first platform from the second platform via the connector platform.

Figure 4:
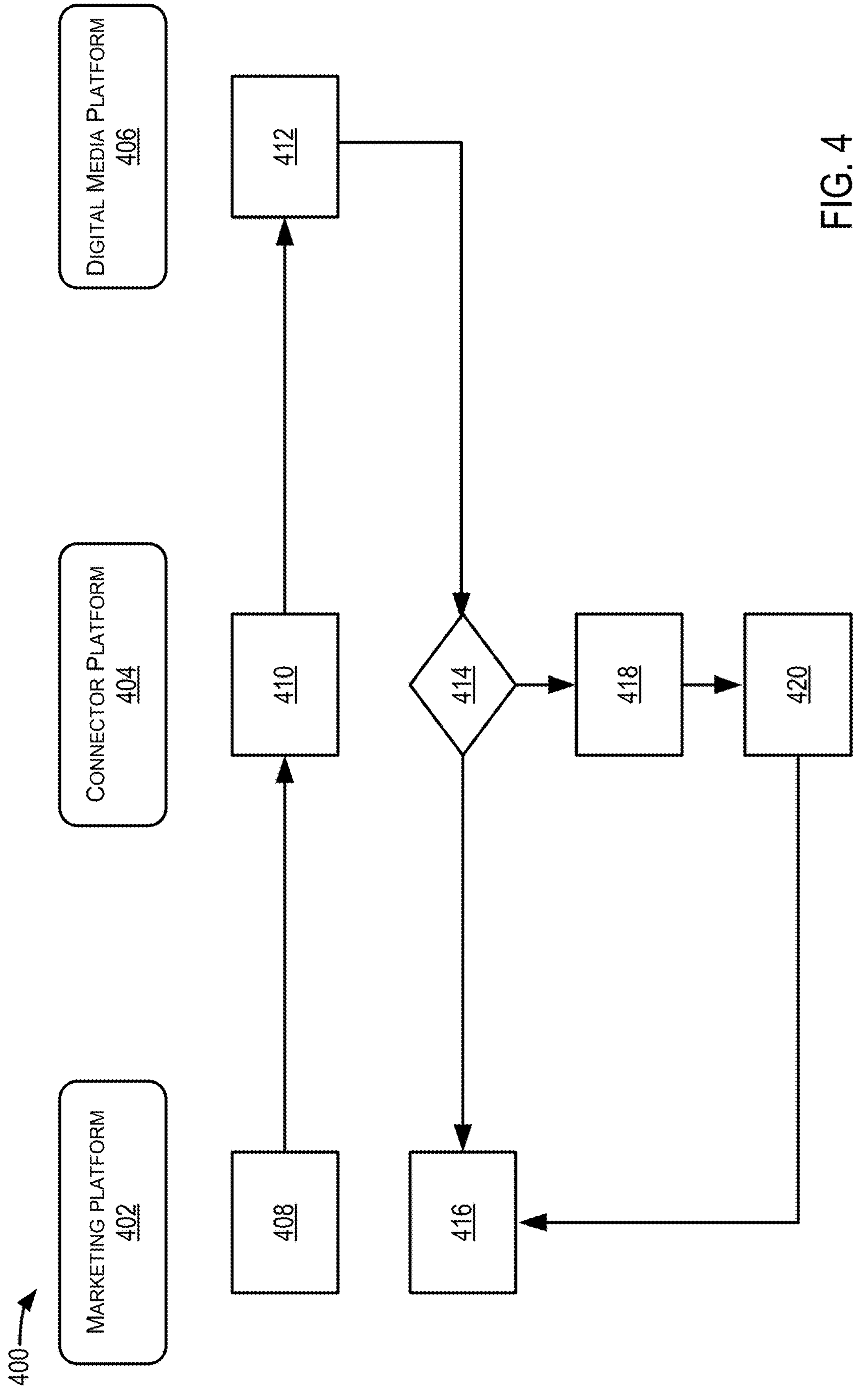
FIG. 4 illustrates an example process of how the connector platform system can manage data in disparate platforms.

FIG. 4 illustrates a proactive monitoring process 400 that depicts an example of how a connector platform system as described herein can manage data across disparate platforms. Proactive monitoring can be performed by a connector platform to obtain fast, consistent, and reliable results so that a marketing platform and/or end user need not be concerned with call or response failures. Proactive monitoring can produce alerts when a request fails or produces an error, e.g., based on inadequate or incomplete data, and may cause an alert on the connector platform in the form of a message, email, voicemail, text, etc. In some examples, the connector platform may cause an alert to be presented to the marketing platform and/or end user. In some examples, proactive monitoring can include logging failures and identifying patterns in the associated fields. In various examples, the connector platform can obtain and/or share logged failure information from a cloud-based service such as GOOGLE PUB/SUB and similar asynchronous, scalable messaging services or analytics and data integration pipelines that uncouple services that produce messages from services that process those messages. In some instances, a connector platform can proactively reconfigure a query into multiple smaller queries for the associated fields in order to avoid or reduce the failures identified as part of the pattern.

Process 400 includes operations in three sections. The left-most illustrated section is associated with a marketing platform 402, such as GMP, MICROSOFT ADS, THE TRADE DESK, AMAZON ADS, etc. The center illustrated section is associated with a connector platform 404 as described herein, such as UNIFIRE from ADSWERVE, operating as a gateway. The right-most illustrated section is associated with a digital media platform 406, such as FACEBOOK, INSTAGRAM, TIK TOK, etc. In some examples, the digital media platform 406 can include individual types of platforms such as for mobile applications, mobile browsers, and desktop applications and/or browsers. In such examples, the connector platform 404 can configure queries specific to the individual types of digital media platforms 406.

Block 408 represents a request for data coming from marketing platform 402 to connector platform 404. Block 410 represents the connector platform 404 serving as an interface for the request, that is receiving the request 408, configuring the request in accordance with protocols of connector platform 404 to meet formatting requirements of digital media platform 406, and passing the configured request as a query to digital media platform 406. In at least one example, the connector platform 404 can employ multi-threading to pass the configured request/query to the digital media platform 406. Block 412 represents the digital media platform 406 producing a response, e.g., data and/or error, in response to the query and passing the response to the connector platform 404.

Decision block 414 represents the connector platform 404 determining whether the response from the digital media platform 406 includes an error. When the connector platform 404 determines that the response from the digital media platform 406 does not include an error, the connector platform 404 configures the response in accordance with protocols of connector platform 404 to meet formatting requirements of marketing platform 402, and the connector platform 404 provides the configured response to the marketing platform 402 for consumption as illustrated by block 416.

When the connector platform 404 determines that the response from the digital media platform 406 includes an error, the connector platform 404 can apply API quota management at block 418 to reconfigure and retry queries to the digital media platform 406 in order to fulfill the request from the marketing platform 402. In at least one example, block 418 can include API quota management in which the connector platform 404 reconfigures the query into multiple smaller queries such as a first subquery for data associated with a subset (M) of fields included in the original query, where M is any integer greater than and/or equal to 1. In at least one example the subset M equals the number of fields included in the original query. In some examples, the subset M may be larger or smaller than the number of fields included in the original query. A subquery corresponds to at least one subpart of the original request, and the multiple subqueries associated with the original request equate to the original query. Examples of fields can include campaign_id, adset_id, ad_id, clicks, impressions, spend, actions, cost_per_action_type, unique_inline_link_clicks, cost_per_unique_inline_link_click, reach.inline_link_clicks, cost_per_inline_link_click, estimated_ad_recallers, cost_per_estimated_ad_recallers, etc. In various examples, a connector platform can employ different call strategies; for example, calling a uniform resource locator (URL) for the digital media platform using a get method requests that the digital media platform immediately return a result, whereas calling the URL for the digital media platform using a post method requests that the digital media platform produce and return a report.

Based on the connector platform 404 successfully receiving responses to the M reconfigured queries represented by block 418 from the digital media platform 406, block 420 illustrates the connector platform 404 assembling the responses to the M reconfigured queries, e.g., by stitching, concatenating, etc., and configuring the assembled response in accordance with protocols of connector platform 404 to meet formatting requirements of marketing platform 402, and the connector platform 404 providing the configured and assembled response to the marketing platform 402 for consumption as illustrated by block 416. In various examples, the connector platform can consistently provide reliable assembled responses to the marketing platform 402 in half, one-third, even one-sixth or one-eighth of the time of previous approaches, e.g., 10 seconds v. 20, 30, 60, or 80 seconds in at least one example. In many examples, the connector platform can consistently provide fast and reliable assembled responses to the marketing platform 402 in instances that resulted in failures absent the techniques of the connector platform.

Figure 5:
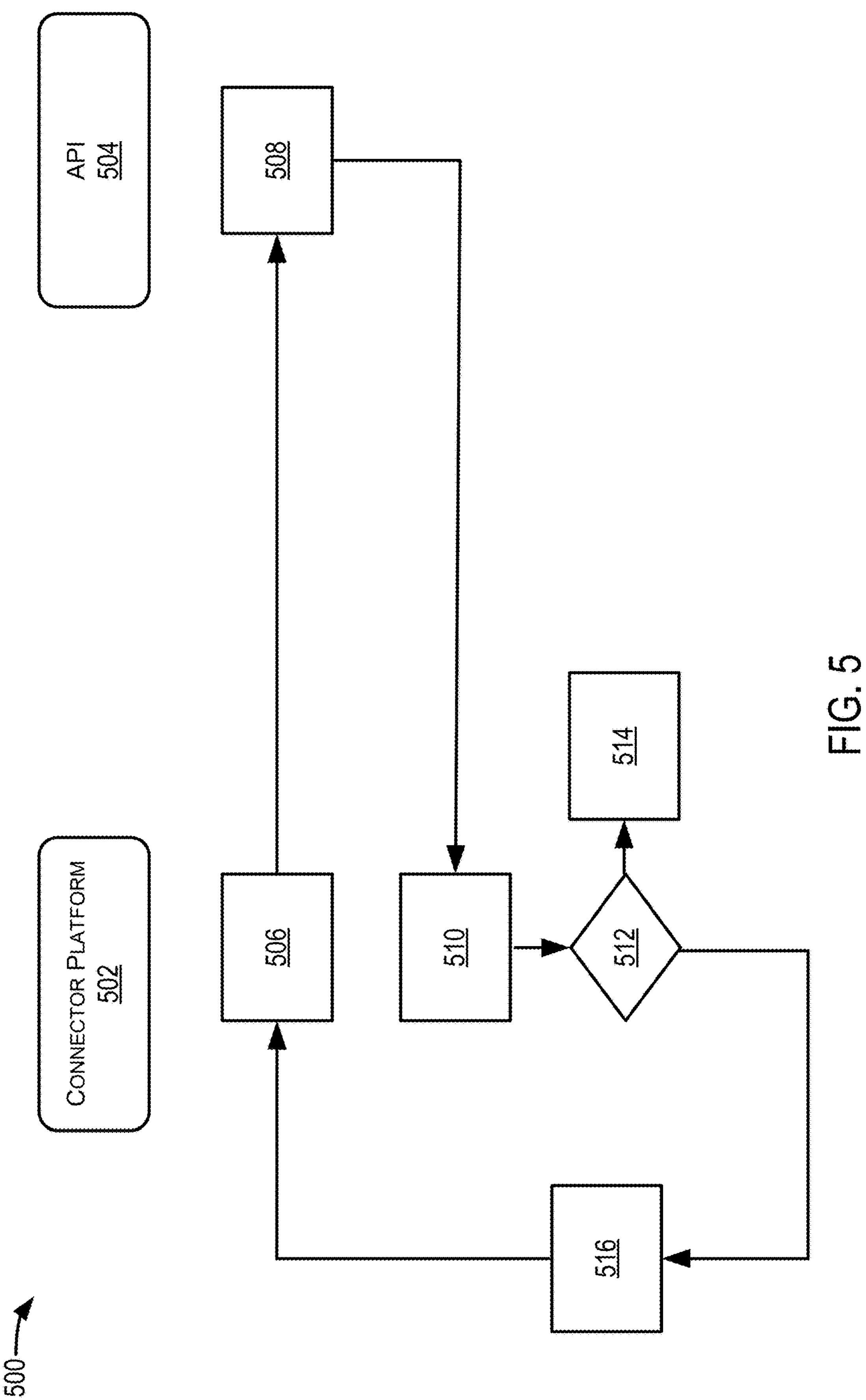
FIG. 5 illustrates an example process of how the connector platform system can manage data in disparate platforms.

FIG. 5 illustrates another view of parts of an example proactive monitoring process 500, which can correspond to parts of process 400, e.g., a determination of an unsuccessful query at block 414 of FIG. 4, in some examples. Process 500 depicts an example of how a connector platform 502 as described herein can manage data across disparate platforms by interacting with application programming interfaces (APIs) 504.

In at least one example, connector platform 502 sends one or more calls or queries represented by block 506 to API 504. When API 504 produces a failure response represented by block 508, the connector platform 502 handles the failure represented at block 510.

Handling the failure can include or be associated with additional processes and/or subprocesses. For example, block 510 can include API quota management, such as connector platform 502 reconfiguring the call or query into multiple smaller pieces as discussed above regarding block 418 of FIG. 4. Block 510 can also represent the connector platform having the ability to retry calls or queries on behalf of a marketing platform, which can relieve the marketing platform and/or end user from the burden of handling failed calls or queries. In addition to connector platform 502 deconstructing large calls or queries into multiple smaller pieces, block 510 can include connector platform 502 regularly syncing connections with the disparate platforms. In at least one example, such regular syncing can drive retrying failed calls or queries, and in at least one example the connector platform 502 retrying is opaque to the marketing platform and/or end users. In various examples, syncing can take place substantially continuously, e.g., at about 1-minute intervals, at about five-minute intervals, at about 10-minute intervals, at about 15-minute intervals, at about 20-minute intervals, etc., and/or can be optimized according to the particular digital marketing platform involved.

In at least one example the protocols of connector platform 502 can include a maximum number of retries of failed calls or queries, including of individual of the smaller pieces of calls or queries. For example, the connector platform 502 can be configured to retry a call or query for a particular field 3, 4, 5, . . . 25, etc. times. The connector platform 502 can attempt to retry calls and queries a number of times optimized to return the greatest numbers of successful responses for the least number of queries. Decision block 512 represents the connector platform 502 ascertaining whether an unsuccessfully retried call or query represents the maximum number of retries. If yes, then an error is returned as depicted by block 514. In at least one example, the error depicted by block 514 can be in the form of an alert on the connector platform such as a message, email, voicemail, text, etc. to relieve the marketing platform and/or end user from the burden of handling failed calls or queries. In some examples, the connector platform may cause an alert to be presented to the marketing platform and/or end user.

In at least one example, when block 512 determines that an unsuccessfully retried call or query represents less than the maximum number of retries, the connector platform 502 can employ an exponential backoff, depicted at block 516, as an individual calling enhancement for one or more of the individual of the smaller pieces of calls or queries. The exponential backoff represented by block 516 is a period of time to wait before retrying that can be calculated as ten seconds to an exponent of the number of previous tries. Thus, in this example, for a second try, the exponential backoff would represent waiting 100 seconds ($10^2$ or 10 to the second power) before retrying, though other calculations are possible.

In various examples, accessing data associated with the first user account on the first platform via the UI on the second platform can include modifying at least a part of the data associated with the first user account on the first platform via the UI from the second platform, importing at least a part of the data associated with the first user account on the first platform via the UI into the second platform, and/or exporting new data from the second platform to the first platform based on instructions received via the UI.

Although the techniques have been described in language specific to structural features and/or methodological acts, it is to be understood that the appended claims are not necessarily limited to the features and/or acts described. Rather, the features and acts are described as example implementations of such techniques. For example, network 108, processing unit(s) 112/134, and other structures described herein for which multiple types of implementing devices or structures are listed can include any of the listed types, and/or multiples and/or combinations thereof.

The operations of the example processes are illustrated in individual blocks and summarized with reference to those blocks. The processes are illustrated as logical flows of blocks, each block of which can represent one or more operations that can be implemented in hardware, software, and/or a combination thereof. In the context of software, the operations represent computer-executable instructions stored on one or more computer-readable media that, when executed by one or more processors, enable the one or more processors to perform the recited operations. Generally, computer-executable instructions include routines, programs, objects, modules, components, data structures, and the like that can configure a processor to perform particular functions and/or implement particular abstract data types. The order in which the operations are described is not intended to be construed as a limitation, and any number of the described operations can be executed in any order, combined in any order, subdivided into multiple sub-operations, and/or executed in parallel to implement the described processes. The described processes can be performed by resources associated with one or more computing device(s) 102, 104, etc., such as one or more internal and/or external CPUs and/or GPUs, and/or one or more pieces of hardware logic such as FPGAs, DSPs, and/or other types described above.

All of the methods and processes described above can be embodied in, and fully automated via, software code and/or modules executed by one or more general-purpose computer (s) and/or processor(s) thereby reconfiguring the general-purpose computer(s) and/or processor(s) as special purpose computer(s) and/or processor(s) during their execution. In various examples, the code and/or modules can be produced using the language TypeScript and compiled using one or more libraries, e.g., Express Library, into JavaScript, and a process manager, e.g., for JavaScript and configuration files, such as in JSON format, DYAML format, etc. In some examples, the code and/or modules can be produced natively in JavaScript. The code and/or modules can be stored in any type of computer-readable storage medium and/or other computer storage device. Some and/or all of the methods can be embodied in specialized computer hardware.

Conditional language such as, among others, "can," "could," "might" and/or "may," unless specifically stated otherwise, are understood within the context to present that certain examples include, while other examples need not include, certain features, elements and/or steps. Thus, such conditional language is not generally intended to imply that certain features, elements and/or steps are in any way required for one or more examples and/or that one or more examples necessarily include logic for deciding, with and/or without user input and/or prompting, whether certain features, elements and/or steps are included and/or are to be performed in any particular example. The word "or" is used herein in an inclusive sense unless specifically stated otherwise. Accordingly, conjunctive language such as the phrases "X, Y, or Z" or "at least one of X, Y or Z," unless specifically stated otherwise, is to be understood as signifying that an item, term, etc., can be either X, Y, or Z, or any combination thereof.

Any routine descriptions, elements and/or blocks in the flow diagrams described herein and/or depicted in the attached figures should be understood as potentially representing modules, segments, and/or portions of code that include one or more executable instructions for implementing specific logical functions and/or elements in the routine. Alternative implementations are included within the scope of the examples described herein in which elements and/or functions can be deleted and/or executed out of order from any order shown or discussed, including substantially synchronously and/or in reverse order, depending on the functionality involved as would be understood by those skilled in the art. It should be emphasized that many variations and modifications can be made to the above-described examples, the elements of which are to be understood as being among other acceptable examples. All such modifications and variations are intended to be included herein within the scope of this disclosure and protected by the following claims. Moreover, in the claims, any reference to a group of items provided by a preceding claim or clause is a reference to at least some and not necessarily all of the items in the group of items, unless specifically stated otherwise. Furthermore, in some examples, any or all of the components can be implemented as one or more operating systems, as one or more stand-alone applications, as one or more modules of an application, as one or more plug-ins, as one or more library functions application programming interfaces (APIs) that can be called by other applications, and/or as a cloud-computing model.

The methods described herein are not limited to being performed using the systems and/or devices described regarding FIGS. 1 through 5 and can be implemented using systems and devices other than those described herein.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as example forms of implementing the claims.

What is claimed is:

1. A system comprising:

one or more processors; and one or more computer-readable media communicatively coupled to the one or more processors, the one or more computer-readable media storing thereon computer executable instructions that, when executed by the one or more processors, cause the one or more processors to perform operations comprising:

authenticating a connector platform with a first platform and a second platform;

by the connector platform employing API quota management:

reconfiguring a request from the first platform to a query format acceptable to the second platform as an original query, and providing the original query to the second platform, and based on the original query failing, reconfiguring the request into multiple subqueries, wherein a subquery corresponds to at least one subpart of the original query associated with a subset of fields from the original query and the multiple subqueries equate to the original query;

generating a unique gateway account key to enable the connector platform to access data associated with a first user account on the first platform and a second user account on the second platform;

providing the unique gateway account key to at least one of the first platform or the second platform;

creating a persistent connection between the first platform and the second platform; and enabling access to the data associated with the first user account on the first platform from the second user account on the second platform via the connector platform.

2. The system of claim 1, wherein the connector platform includes a heterogenous connector platform or a universal connector platform.

3. The system of claim 1, wherein at least one of the first platform or the second platform includes a digital media platform.

4. The system of claim 1, wherein the operations further comprise, prior to authenticating the connector platform:

presenting a user interface (UI);

receiving a selection of the connector platform via the UI; and initiating the providing the unique gateway account key to the at least one of the first platform or the second platform via the UI.

5. The system of claim 4, wherein enabling access to the data associated with the first user account on the first platform from the second platform via the connector platform comprises accessing the data associated with the first user account on the first platform via the UI presented via the connector platform.

6. The system of claim 5, wherein accessing the data associated with the first user account on the first platform via the UI in the connector platform includes at least one of:

modifying at least a part of the data associated with the first user account on the first platform via the UI from the connector platform, importing at least a part of the data associated with the first user account on the first platform via the UI into the connector platform, or exporting new data from the second platform to the first platform based on an instruction received via the UI of the connector platform.

7. The system of claim 1, wherein at least one of:

the connector platform is uniquely associated with a respective platform of a plurality of disparate platforms; or the first platform and the second platform are based on disparate communication protocols.

8. The system of claim 1, further comprising a plurality of servers, wherein:

the one or more processors and the one or more computer-readable media are distributed among the plurality of servers, and the connector platform is distributedly hosted by the plurality of servers.

9. The system of claim 1, wherein, based on the original query failing, the operations further comprise, by the connector platform employing API quota management, at least one of:

sending a plurality of the multiple subqueries via multi-threaded queries;

employing an exponential backoff to retry one or more queries of the original query and/or the subqueries;

assembling responses from the second platform to obtain a full response to the request; or providing the full response to the request to the first platform.

10. A method comprising:

authenticating a connector platform with a first platform and a second platform, the first platform and the second platform being disparate platforms;

reconfiguring a request from the first platform to a query format acceptable to the second platform as an original query, and providing the original query to the second platform;

based on the original query failing, reconfiguring the request into multiple subqueries, wherein a subquery corresponds to at least one subpart of the original query and the multiple subqueries equate to the original query;

generating a unique gateway account key for enabling the connector platform to access data associated with a first user account on the first platform and a second user account on the second platform;

providing the unique gateway account key to at least one of the first platform or the second platform;

creating a persistent connection between the first platform and the second platform; and enabling access to the data associated with the first user account on the first platform from the second platform via the connector platform.

11. The method of claim 10, wherein the connector platform includes a heterogenous connector platform or a universal connector platform.

12. The method of claim 10, wherein at least one of the first platform or the second platform includes a digital media platform.

13. The method of claim 10, further comprising, prior to authenticating the connector platform:

presenting a user interface (UI);

receiving a user-selection of the connector platform via the UI; and performing the providing the unique gateway account key to the at least one of the first platform or the second platform via the UI.

14. The method of claim 13, further comprising:

accessing the data associated with the first user account on the first platform via the UI presented in the connector platform.

15. The method of claim 14, wherein accessing the data associated with the first user account on the first platform via the UI in the connector platform includes at least one of:

modifying at least a part of the data associated with the first user account on the first platform via the UI from the connector platform, importing at least a part of the data associated with the first user account on the first platform responsive to an input received via the UI into the connector platform, or exporting new data from the second platform to the first platform responsive to an input received via the UI of the connector platform.

16. The method of claim 10, wherein at least one of:

the connector platform is uniquely associated with a respective platform of a plurality of disparate platforms; or the connector platform is distributedly hosted by a plurality of servers.

17. The method of claim 10, based the original query failing, further comprising at least one of:

sending a plurality of the multiple subqueries via multi-threaded queries;

employing an exponential backoff to retry one or more queries;

assembling responses from the second platform to obtain a full response to the request; or providing the full response to the request to the first platform.

18. A non-transitory computer-readable medium storing thereon computer executable instructions that, when executed by one or more processors, cause the one or more processors to perform operations comprising:

authenticating a connector platform with a first platform and a second platform, the first platform and the second platform based on disparate platforms;

reconfiguring a request from the first platform to a query format acceptable to the second platform as an original query, and providing the original query to the second platform;

based on the original query failing, reconfiguring the request into multiple subqueries, wherein a subquery corresponds to at least one subpart of the original query and the multiple subqueries equate to the original query;

generating a unique gateway account key for enabling the connector platform to access data associated with a first user account on the first platform and a second user account the second platform;

entering the unique gateway account key to at least one of the first platform or the second platform;

creating a persistent connection between the first platform and the second platform; and enabling access to the data associated with the first user account on the first platform from the second platform via the connector platform.

19. The non-transitory computer-readable medium of claim 18, wherein the connector platform includes a heterogenous connector platform or a universal connector platform.

20. The non-transitory computer-readable medium of claim 18, wherein at least one of the first platform or the second platform includes a digital media platform.

* * * * *